(12) United States Patent
Cortesi

(10) Patent No.: US 6,568,160 B1
(45) Date of Patent: May 27, 2003

(54) STIRRUP AND LEATHER COVERS

(76) Inventor: Rita Ellinor Cortesi, 707 Fairview La., Bartlett, IL (US) 60103

( * ) Notice: Subject to any disclaimer, the term of this patent is extended or adjusted under 35 U.S.C. 154(b) by 0 days.

(21) Appl. No.: 09/271,570

(22) Filed: Mar. 18, 1999

(51) Int. Cl.$^7$ .................................................. B68C 1/02
(52) U.S. Cl. ........................................................ 54/44.1
(58) Field of Search .............................. 54/44.1, 47, 82, 54/46.1, 46.2

(56) References Cited

U.S. PATENT DOCUMENTS

| | | | | |
|---|---|---|---|---|
| 1,043,978 A | * | 11/1912 | St. John ........................ | 54/44.1 |
| 1,175,742 A | * | 3/1916 | French ........................... | 54/47 |
| 4,683,710 A | * | 8/1987 | Westropp ....................... | 54/82 |
| 4,736,800 A | * | 4/1988 | Rohner .......................... | 168/18 |
| 4,981,010 A | * | 1/1991 | Orza et al. .................... | 54/82 |
| 5,715,661 A | * | 2/1998 | Meyers .......................... | 54/82 |

* cited by examiner

Primary Examiner—Thomas Price
(74) Attorney, Agent, or Firm—Charles F. Meroni, Jr.; Paul D. Pressley

(57) ABSTRACT

A removable stirrup cover and removable leather cover for providing substantial protection against abrasions and scuff marks of the flap and panel area of an english saddle. The covers consist of smooth, nonabrasive materials that help preserve the value and aesthetics of the english saddle. The stirrup cover is employed during storage of the saddle by placing the stirrup cover over the stirrup providing protection to the saddle. The leather cover is alternatively employed during use of the english saddle by covering the saddle leathers with the leather covers, preventing saddle abrasions created by the leathers rubbing against the panel area.

12 Claims, 4 Drawing Sheets

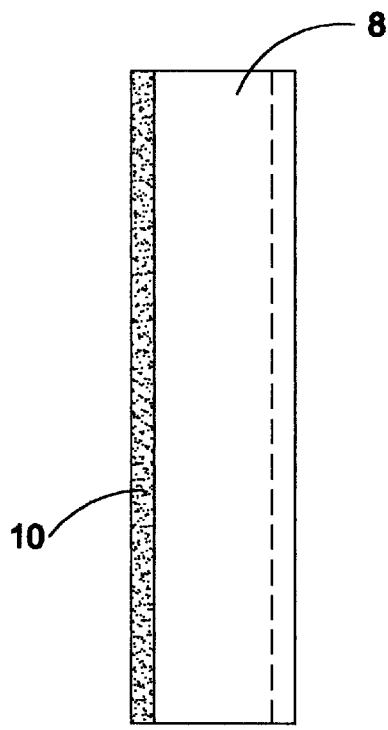
FIG. 4
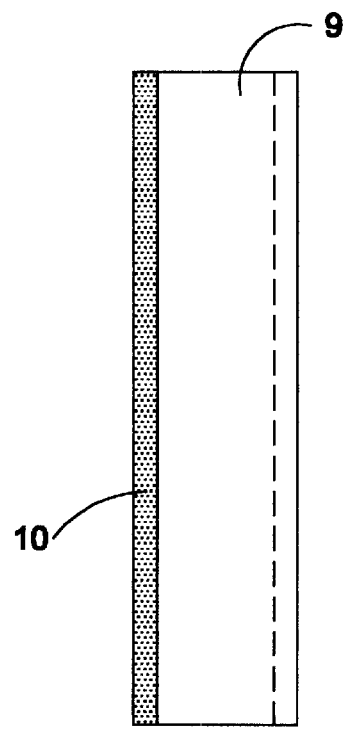
FIG. 5
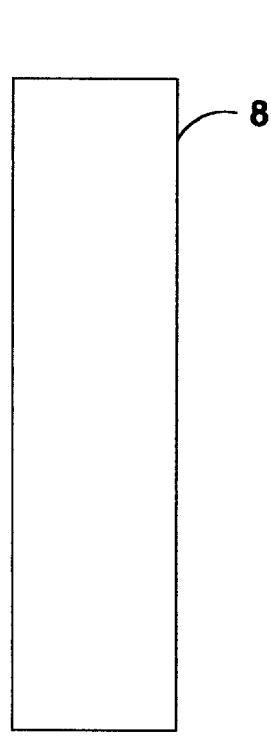
FIG. 6
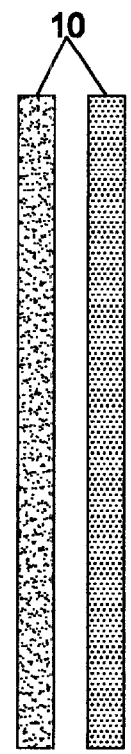

STIRRUP AND LEATHER COVERS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

It is well known in the equestrian world that leather english saddles are expensive. The regular maintenance and care recommended for english saddles is basically for softening and cleaning leather. This is not sufficient to protect leather from the damage of abrasions and scuff marks which develop and appear suddenly and frequently on the flap and panel area of the english saddle. Most abrasions and scuff marks are caused by two factors. The consistent horizontal swinging motion created by the riders legs causes rubbing by the inner stirrup leathers unto the flap and panel areas, thereby causing unsightly abrasions. The second factor being, the procedure after riding is to slide and secure the stirrup upwards to approximately the center of the flap and panel area, thereby causing scuff marks.

Therefore, it is a principle object of this invention to provide a novel removable stirrup cover and removable leather cover which are integral for substantial maximum protection against abrasions and scuff marks of the flap and panel area of an english saddle.

The field of this invention relates to horse tack accessories and is applicable to U.S. Patent Classification Definition title, "Harness"; Class Number 54.

BRIEF SUMMARY OF THE INVENTION

The invention, english equestrian "Stirrup & Leather Covers", offer several advantages as follows:
  a) to provide substantial maximum protection to the flap and panel area when used alternately on an english saddle;
  b) to help retain the beauty and value of the english saddle;
  c) to provide preservation qualities for new and used english saddles flap and panel areas;
  d) to provide practical, removable protection that is convenient to use;
  e) to provide an affordable product that is inexpensive to manufacture;
  f) to provide various sized leather covers and various sized stirrup covers;
  g) to provide variable notions; notions means items used as a alternative closure; hook-and-loop fasteners, zippers, snaps, etc. can be used as substitute closures.

Further objects and advantages will become apparent from a consideration of the drawings and ensuing description.

DESCRIPTION OF THE SEVERAL VIEWS OF THE DRAWING

In the drawings, closely related figures have the same number but different alphabetic suffixes.

FIGS. 4 to 6 shows a plan view of leather cover, the flipside view, and sectional view of the pattern pieces.

Figure 1:
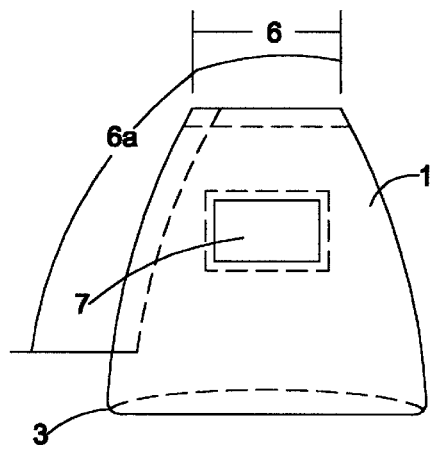
FIGS. 1 to 3 show a plan view, a side view perspective, and sectional view for the pattern pieces of the stirrup cover.

The following page 5 contains the Reference Numerals In Drawings, and are listed in numerical order under corresponding headings, For Stirrup Cover, For Leather Cover and Description of Saddle Parts.

REFERENCE NUMERALS IN DRAWINGS

For Stirrup Cover:
  1 stirrup cover-front
  2 stirrup cover-back
  3 stirrup cover-bottom
  4 two inside rectangular frame pieces
  5 two velcro strips
  6 opening span
  6a full opening span
  7 rectangular hole For Leather Cover:
  8 rectangular fabric-inside
  9 rectangular fabric-flipside
  10 two hook-and-loop fasteners Description of Saddle Parts:
  12 panel
  13 flap
  14 inner stirrup leather
  15 outer stirrup leather
  16 stirrup

DESCRIPTION OF THE INVENTION

Figure 2:
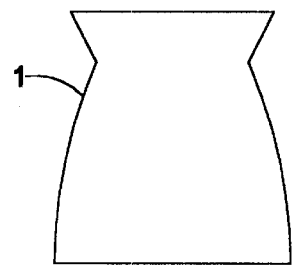
Figure 2:
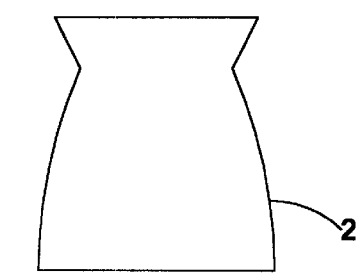
Figure 2:
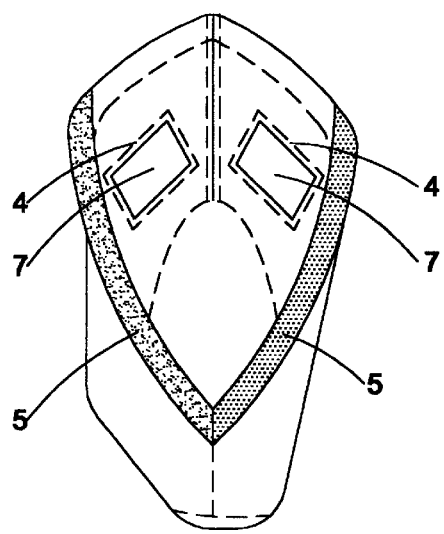
Figure 3:
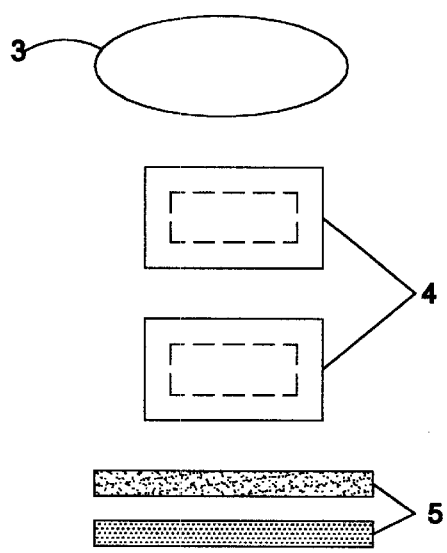
Figure 7:
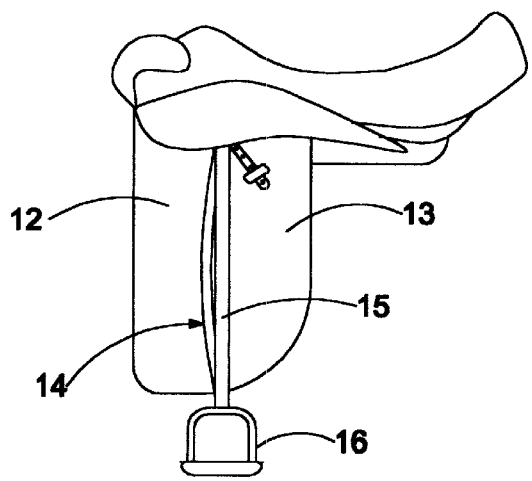
FIG. 7 illustrates some details of saddle parts pertinent to the understanding of the invention showing stirrup in down position.
Figure 8:
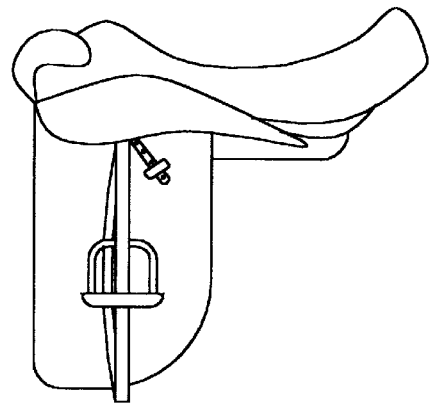
FIG. 8 illustrates the stirrup in upward position; the proper procedure followed after riding horse and dismounting.

The stirrup cover in FIG. 1 is shown (front view) and FIG. 2 shows a side view perspective showing full opening span 6a for inserting the stirrup 16 FIG. 7, into the stirrup cover FIG. 1. The pattern pieces in FIG. 3 are of a predetermined size to fit stirrup 16 of various sizes. The stirrup cover is fabricated in a conventional manner. The fabric for the stirrup cover consists of smooth, nonabrasive material. The following steps describe the process to assemble stirrup cover:

1) on the front 1 and back 2 FIG. 3 pieces, a rectangular hole is cut congruent to one another approximately 2" inches down from the top; the rectangular hole 7 is approximately 2" inches wide×1" inch long;
  2) two rectangular frames 4 are cut with approximate dimensions of 3" inches wide and 2" inches length, one for the inside front and one for the inside back and and sewn around the rectangular hole 7 to finish and protect seam.
  3) two hook-and-loop-fasteners 5 are sewn; one on front 1 inside top corner, along the side, to approximately the bottom FIG. 2; the second hook-and-loop fastener 5, with opposite textured side, is sewn on back 2 outside top corner, along the side, down to approximately the bottom FIG. 2;

4) front 1 and back 2 are sewn together at the side by laying both pieces on top of one another; front inside surface overlying back outside surface and sewing from top corner, along the side, to bottom corner.
5) then the sides with the hook-and-loop-fasteners is sewn from approximately the bottom corner up to the end of the hook-and-loop-fasteners closure surface FIG. 1;
6) optional alternative closures can be added, such as zippers, snaps, buttons, etc.
7) the stirrup cover turned inside out, the bottom piece 3 is sewn around the entire bottom surface.

The stirrup cover secured with the hook-and-loop-fasteners provides an opening span 6 for the width of the inner stirrup leather 14 and is approximately 3" inches wide. The stirrup cover provides a full opening span 6a from top corner of surface along the side to end of hook-and-loop-fastener approximately 8" inches long.

Figure 10:
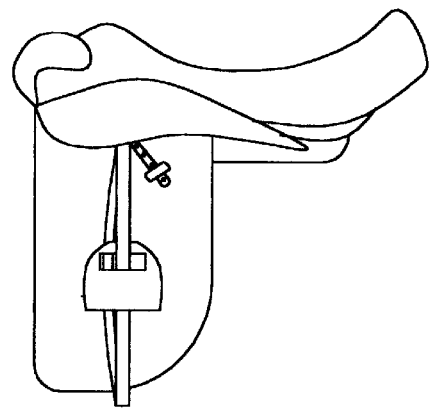
FIG. 10 is a perspective view of stirrup cover secured on stirrup when storing saddle for next ride.
Figure 11:
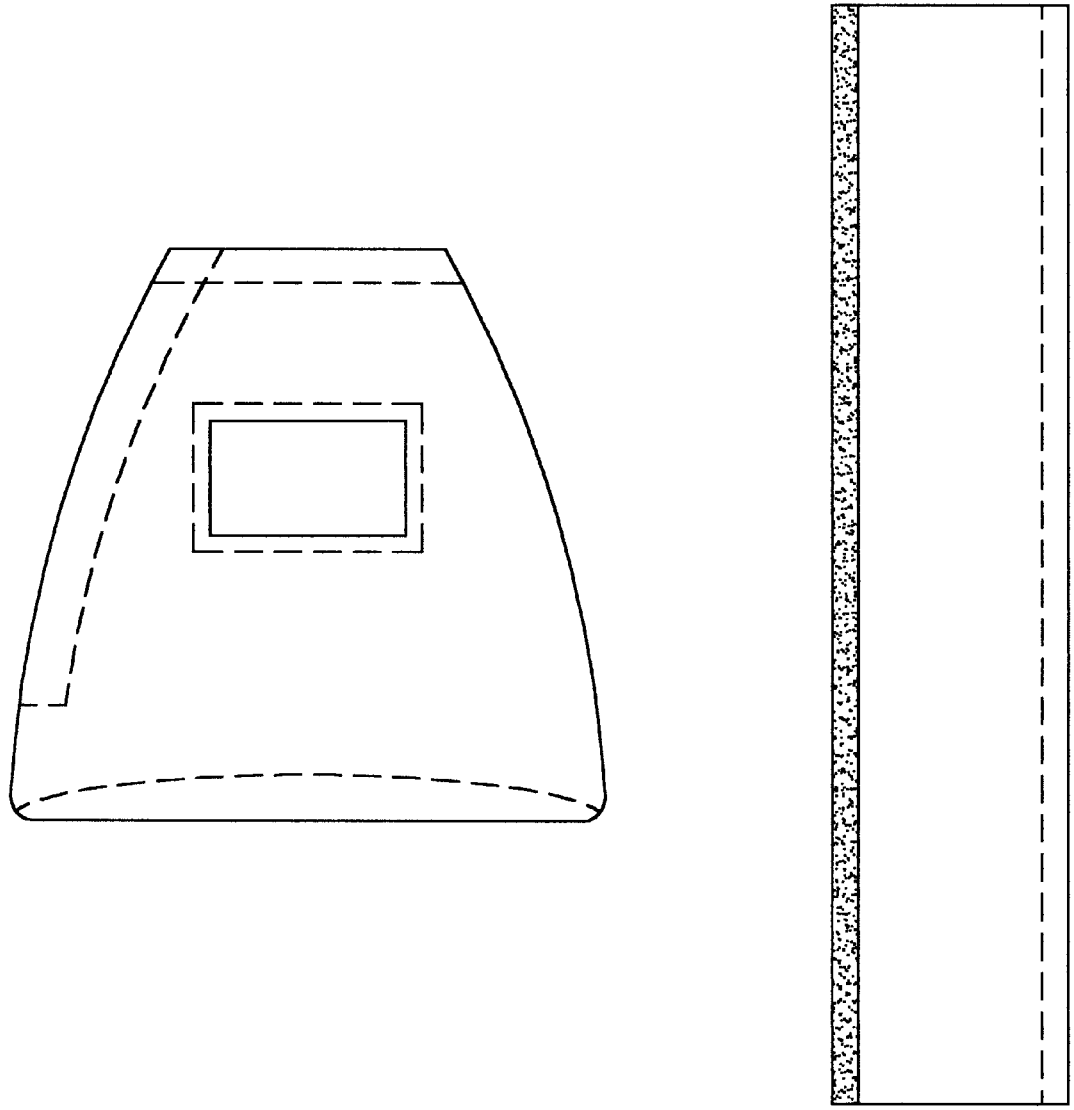
FIG. 11 is a plan view of the stirrup cover and leather cover.

The stirrup covers method of use is hereby explained. After riding a horse, the rider dismounts and inserts the stirrup 16 into the stirrup cover FIG. 2 and encloses it with hook-and-loop-fasteners. Next the rider manually slides the stirrup cover FIG. 10 upwards along the flap 13 and panel 12 area on the inner stirrup leather 14 and secures the stirrup in approximately the center of flap and panel area as shown in FIG. 10. This is a procedure followed by english riders when storing the the saddle for the next ride.

The leather cover in FIG. 4 is shown (front view) and FIG. 5 shows the flipside view. The pattern pieces FIG. 6 are of a predetermined size to fit various lengths of stirrup leathers 14. Dressage riders would use approximately 18" inch length for their leather cover and english hunter jumpers would use a shorter length of approximately 15" inches. The leather cover can be made for various lengths.

The fabric for a leather cover consists of smooth, non-abrasive material. The leather cover is fabricated in a conventional manner. The following steps describe the process to assemble a leather cover:

1) the rectangular fabric is cut according to size required;
2) two-hook-and-loop-fasteners of equal length;
3) one-hook-and-loop fastener is sewn vertically from one top corner to bottom corner;
4) one-hook-and-loop-fastener is sewn vertically on flipside from top corner to bottom corner;
5) add variable notions (optional) of a supporting nature; notions means items used to stiffen or stabilize fabric such as covered poly boning, firm elastic, interfaced stiffening materials and so forth. These may be sewn on vertically or on any surface on the fabric to provide a stabilizing factor utilized for applying leather cover.

Figure 9:
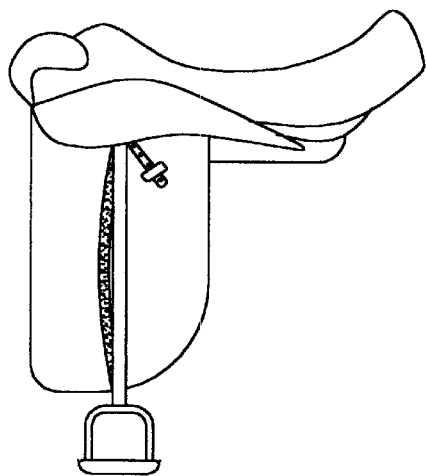
FIG. 9 is a prespective view of stirrup leather cover on inner stirrup leather with stirrup in down position while riding.

The leather covers method of use is hereby explained. Prior to mounting a horse, the rider places leather cover FIG. 4 vertically, centering it behind the inner stirrup leather 14, then proceeds to wrap cover around stirrup leather 14 securing it with-hook-and-loop-fasteners from top to bottom near the stirrup 16 as shown in FIG. 9. Repeat on other side and your ready to ride with great protection for your saddle.

I claim:

1. A method of manufacture for a stirrup cover, a front and a back portion each having the same shape and size, a bottom portion, a partial aperture when secured, and a full aperture when open, the stirrup cover further having a hook-and-loop-fastener closure extending on adjacent sides to bottom proximity, such that a stirrup cover is manufactured in a manner wherein the fabric pieces and closures are assembled separately and then sewn together from a pattern as follows:

A. the stirrup is layed flat on fabric and outlined, a second greater outline is drawn to include a seam allowance, a rectangular hole is drawn with approximate dimensions of two inches wide and one inch length above the medial range of stirrup, an outline is drawn around the bottom of said upright stirrup with a seam allowance, two rectangular pieces with approximate dimensions of three inches wide and two inches length are drawn for the rectangular frames, seamlines are drawn, said pieces are cut from fabric with the pattern pieces,
B. front and back pieces are each layed flat and a rectangular hole is cut on each with approximate dimensions of two inches wide and one inch length,
C. front and back pieces are each layed flat and a rectangular frame is cut for each and sewn on inside surface around rectangular hole, to finish and protect seam,
D. the closures consisting of two hook-and-loop-fasteners; one sewn on front inside top corner portion extending along the side to bottom proximity, the second hook-and-loop-fastener sewn on back outside top corner portion extending along the side to bottom proximity,
E. the top seams are folded inward and down on each front and back piece and sewn,
F. the front outside and back outside facing stacked on each other, seams are sewn from top corner extending along the side to bottom corner connecting the front side and back side,
G. the front outside and back outside facing stacked on each other, the opposite side is sewn from approximately the corner bottom up to the end of closure,
H. the front and back connected, the bottom piece is applied to the surface and sewn entirely around bottom on seamline.

2. A method of manufacture for a stirrup cover of claim 1 wherein the closure is comprised of alternative items such as zippers, snaps, buttons, etc., can be used for this invention.

3. A method of manufacture for a stirrup cover of claim 1 wherein sewing is used as method of assembly, other fastening means such as localized heat application, gluing, etc., are within the scope of this invention.

4. A method of manufacture for leather cover consisting of one rectangular piece of fabric having a flipside, the closure consisting of two hook-and-loop-fasteners, such that a leather cover is manufactured in a manner wherein the fabric and closures are assembled separately and then sewn together as follows:

A. a rectangular piece of fabric is cut according to a predetermined size,
B. seams are sewn on each side vertically from top corner to bottom corner,
C. two hook-and-loop-fasteners are sewn vertically on the rectangular piece of fabric, one on one top corner side to bottom corner side, the other on the flipside from top corner side to bottom corner side,
D. any optional notions can be added; notions means any items used additionally; such as covered poly boning, elastic, interfaced stiffening materials to support, stiffen, and stabilize fabric is sewn on any surface of leather cover.

5. A method of manufacture of a leather cover of claim 4 wherein the closure is comprised of snaps; ballstuds sewn from top corner side intermittently to bottom corner side and flipside consisting of socket studs.

6. A method of manufacture for leather cover of claim 4 wherein sewing is used as method of assembly, other fastening means such as localized heat application, gluing, etc., are within the scope of this invention.

7. A removable stirrup cover for use with an english equestrian saddle, the stirrup cover comprising:
- a front portion made of a nonabrasive textured fabric sized and shaped to cover half of a stirrup having a top edge, bottom edge, first edge, and second edge, the front portion having an aperture through the front portion and a first fastening means adjacent the first edge;
- a back portion made of a nonabrasive textured fabric having the same size and shape as the front portion, the back portion having a top edge, bottom edge, first edge, and second edge, the back portion having an aperture through the back portion positioned congruent to the aperture in the front portion when the front and back portions are aligned and a second fastening means adjacent the first edge of the back portion, the second fastening means positioned to fasten to the first fastening means adjacent the first edge of the front portion, the second edge of the back portion connected to the second edge of the front portion, the top edge of front portion and the top edge of the back portion forming an opening for a stirrup leather to pass through; and
- a bottom portion sized and shaped to cover the bottom of a stirrup, the bottom portion connected to the bottom edge of the front portion and to the bottom edge of the back portion.

8. The stirrup cover of claim 7 wherein the first and second fastening means are selected from the group consisting of a hook and loop fastening system, zipper, snaps, or buttons.

9. A removable leather cover for use with an english equestrian saddle, the leather cover comprising:
- a rectangular piece of nonabrasive textured fabric having a first edge and a second edge; and
- a two part fastening system connected to the rectangular piece of nonabrasive textured fabric, the first portion of the fastening system positioned adjacent the first edge of the rectangular piece, the second portion of the fastening system positioned adjacent the second edge of the rectangular piece, the rectangular piece of nonabrasive textured fabric forming a cover for a leather of an english equestrian saddle when the first portion of the fastening system is engaged with the second portion of the fastening system.

10. The leather cover of claim 9 wherein the two part fastening system is selected from the group consisting of a hook and loop fastening system, zipper, snaps, or buttons.

11. A removable stirrup and leather cover system for use with an english equestrian saddle, the system comprising:
- a front portion made of a nonabrasive textured fabric sized and shaped to cover half of a stirrup having a top edge, bottom edge, first edge, and second edge, the front portion having an aperture through the front portion and a first fastening means adjacent the first edge;
- a back portion made of a nonabrasive textured fabric having the same size and shape as the front portion, the back portion having a top edge, bottom edge, first edge, and second edge, the back portion having an aperture through the back portion positioned congruent to the aperture in the front portion when the front and back portions are aligned and a second fastening means adjacent the first edge of the back portion, the second fastening means positioned to fasten to the first fastening means adjacent the first edge of the front portion, the second edge of the back portion connected to the second edge of the front portion, the top edge of front portion and the top edge of the back portion forming an opening for a stirrup leather to pass through;
- a bottom portion sized and shaped to cover the bottom of a stirrup, the bottom portion connected to the bottom edge of the front portion and to the bottom edge of the back portion;
- a rectangular piece of nonabrasive textured fabric having a first edge and a second edge; and
- a two part fastening system connected to the rectangular piece of nonabrasive textured fabric, the first portion of the fastening system positioned adjacent the first edge of the rectangular piece, the second portion of the fastening system positioned adjacent the second edge of the rectangular piece, the rectangular piece of nonabrasive textured fabric forming a cover for a leather of an english equestrian saddle when the first portion of the fastening system is engaged with the second portion of the fastening system.

12. The system of claim 11 wherein the first and second fastening means and the two part fastening system are selected from the group consisting of a hook and loop fastening system, zipper, snaps, or buttons.

* * * * *